United States Patent [19]

Cox

[11] Patent Number: 4,708,374
[45] Date of Patent: Nov. 24, 1987

[54] PLASTIC TEE FITTING

[75] Inventor: Delbert L. Cox, Garden City, Kans.

[73] Assignee: NACO Industries, Inc., Garden City, Kans.

[21] Appl. No.: 635,715

[22] Filed: Jul. 30, 1984

[51] Int. Cl.$^4$ .............................................. F16L 41/00
[52] U.S. Cl. ................................... 285/156; 285/158; 285/197; 285/915; 285/423
[58] Field of Search ............... 285/197, 398, 198, 199, 285/5, 156, 915; 137/318

[56] References Cited

U.S. PATENT DOCUMENTS

| | | | |
|---|---|---|---|
| 2,040,628 | 5/1936 | Recker | 285/156 |
| 3,620,245 | 11/1971 | Finney | 137/318 |
| 3,654,008 | 4/1972 | Rogers et al. | 285/156 X |
| 3,771,546 | 11/1973 | Roos | 137/318 |
| 3,796,445 | 3/1974 | Strott | 285/197 X |
| 4,076,038 | 2/1978 | Wynne | 137/318 |
| 4,530,525 | 7/1985 | Schneider | 285/200 |
| 4,613,168 | 9/1986 | Smith et al. | 285/200 X |
| 4,650,220 | 3/1987 | Grabowski | 285/156 X |

FOREIGN PATENT DOCUMENTS 2443824 2/1976 Fed. Rep. of Germany ...... 285/156

Primary Examiner—Thomas F. Callaghan
Attorney, Agent, or Firm—Kokjer, Kircher, Bradley, Wharton, Bowman & Johnson

[57] ABSTRACT

A plastic Tee fitting formed by a main conduit body and an internally threaded adapter connected to the body at a right angle. The adapter is arranged end to end with a hollow neck which projects from the wall of the main body around a circular opening in the wall. The joint between the neck and adapter is strenghtened by an insert which is fitted in and glued to the neck and adapter on the inside and by a spout which is sleeved around and glued to the neck and adapter on the outside.

8 Claims, 3 Drawing Figures

U.S. Patent  Nov. 24, 1987  4,708,374
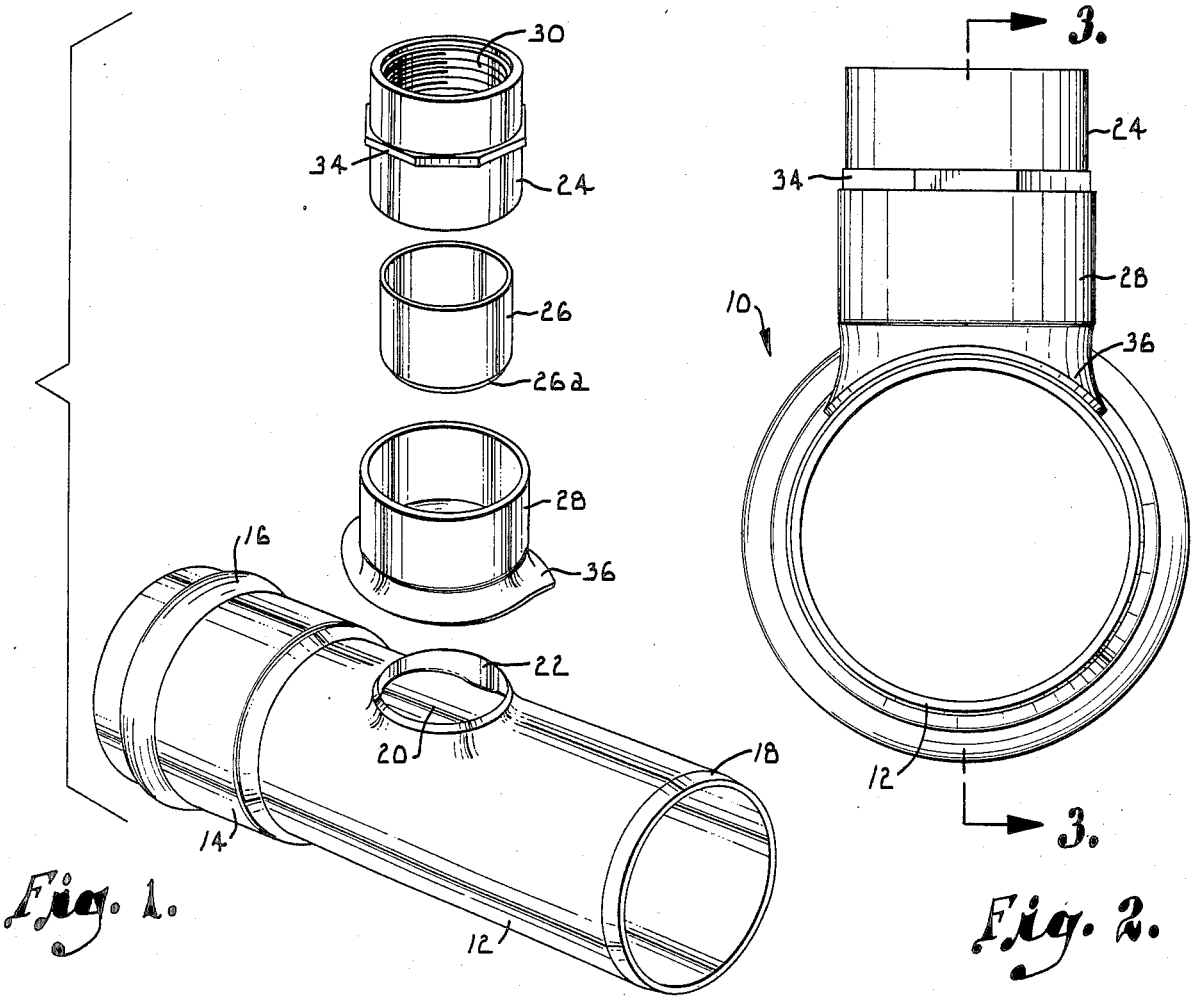
Fig. 1.
Fig. 2.
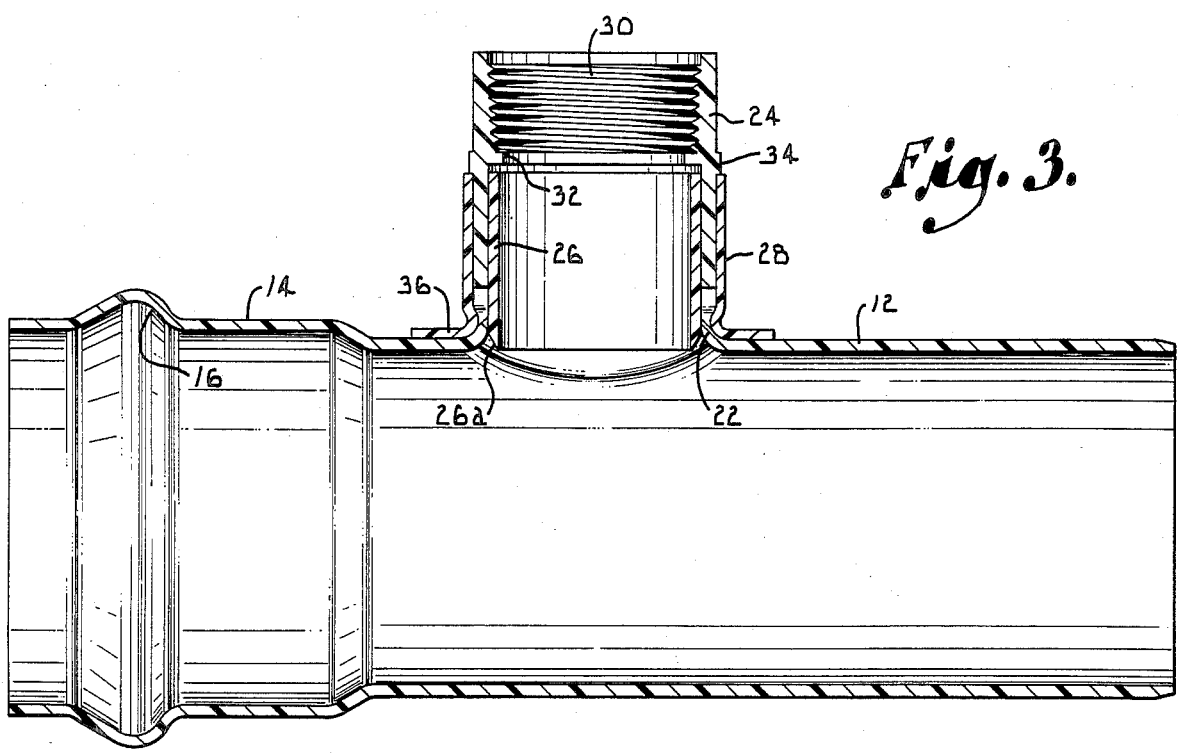
Fig. 3.

4,708,374

PLASTIC TEE FITTING

BACKGROUND AND SUMMARY OF THE INVENTION

This invention relates in general to plastic pipe fittings and more particularly to a Tee fitting of the type commonly used with plastic irrigation pipe and other plastic pipe.

Tee fittings are used in a variety of plastic pipe systems such as those used to supply water for irrigation of agricultural fields. Often, the stem of the fitting must be threaded to provide a threaded connection with another plastic conduit. This type of Tee fitting is conventionally formed by using a main conduit body having its ends suitably shaped to connect with the main flow line. The wall of the main body is provided with a circular opening and a hollow neck which projects outwardly from the pipe wall around the opening. A spout is fitted inside of and glued to the neck at one end. The other end of the spout fits inside of and is glued to an adapter which is internally threaded for connection with an externally threaded pipe.

The main problem with the conventional plastic Tee fitting is that the connection between the spout and neck is relatively weak. Because the neck projects only a short distance, there is little surface area available for the glue joint between the spout and neck, and this joint is susceptible to failure when side forces are applied. Also, the adapter is located well outwardly of the neck with only the spout extending between the neck and adapter. The overall result is that the strength of the conventional Tee fitting is less than satisfactory in many applications and particularly where there is a likelihood of encountering significant side loads.

In recent years, Tee fittings have been available in a stronger construction in which an insert is used to strengthen the joint between the neck and spout. The insert essentially lengthens the neck and is glued to the inside surface of the neck to provide a glue joint having the same surface area as in the conventional construction. The spout is sleeved around and glued to the outside surfaces of both the neck and insert to provide increased strength due to the greater area of the glue joint. The outer end of the spout is fitted in and glued to the threaded adapter in the same manner as in the conventional Tee fitting. Although this construction does strengthen the fitting, it has not completely solved the problem of failure when heavy side blows are applied. Again, only the spout extends between the neck and adapter and only a single glue joint connects the adapter to the end of the spout. In addition, this type of fitting requires a specially shaped spout.

The present invention is directed to an improved plastic Tee fitting which exhibits greater strength than the fittings that have been available in the past. In accordance with the invention, an internally threaded adapter is arranged end to end with the neck on the side of the main conduit body, and the joint between the neck and adapter is strengthened and reinforced on both the inside and outside. A cylindrical insert is received inside of the neck and adapter and is glued to each. On the outside, a spout is sleeved closely around and glued to both the neck and adapter. A flange or saddle on the spout is glued to the outside surface of the main body to further strengthen the fitting. Due to the increased surface areas that are glued together in the area of the joint and the decreased distance of the adapter from the neck, the fitting of the present invention is better able to withstand side forces than the Tee fittings that have been available in the past.

DETAILED DESCRIPTION OF THE INVENTION

In the accompanying drawing which forms a part of the specification and is to be read in conjunction therewith and in which like reference numerals are used to indicate like parts in the various views:

FIG. 1 is an exploded perspective view showing a plastic Tee fitting constructed according to a preferred embodiment of the present invention;

FIG. 2 is an end elevational view of the fitting in its assembled condition; and FIG. 3 is a sectional view taken generally along line 3—3 of FIG. 2 in the direction of the arrows.

Referring now to the drawing in more detail, numeral 10 generally designates a plastic Tee fitting constructed in accordance with the present invention. All parts of the fitting 10 are constructed entirely of polyvinyl chloride or another rigid plastic commonly used in the construction of plastic pipes such as those used in irrigation systems.

The Tee fitting 10 includes a main conduit body 12 having a cylindrical wall and opposite ends which are suitable for connection with the main flow line of the plastic pipe system. The main body 12 has a gasket end 14 which is enlarged somewhat to receive the end of a plastic pipe (not shown). The gasket end 14 has an internal groove 16 for receiving a suitable gasket (not shown) used to seal against the inserted pipe end. The opposite end 18 is a spigot end which can be inserted into the mating end of a connecting pipe. It is to be understood that the ends of the main body 12 can have other configurations such as bell ends or threaded ends to permit connection with the plastic pipe sections.

The wall of the main body 12 is provided with a generally circular opening 20 located approximately midway along the length of the body. Projecting outwardly from the wall of the main body is a rigid hollow neck 22 which is preferably integral with the wall of the main body. The neck 22 is cylindrical and extends completely around the opening 20. The outer edge of the neck 22 may be beveled.

In accordance with the present invention, a female threaded adapter 24 forms an outward extension of the neck 22 and is secured thereto by a cylindrical insert 26 and a spout 28. The adapter 24 is a hollow cylinder having substantially the same inside and outside diameters as the neck 22. On its outer end portion, the adapter 24 is provided with female pipe threads 30. The inner end portion of adapter 24 is plain inwardly of an annular internal rib 32 located at the end of the threads 30. The outside surface of adapter 24 is provided approximately midway along its length with a series of flats 34.

The insert 26 is a hollow cylinder having a length considerably greater than that of the neck 22. The inner edge of the insert is preferably beveled as indicated at 26a. The outside diameter of insert 26 is substantially equal to the inside diameters of the neck 22 and adapter 24.

The spout 28 is also a hollow cylindrical member having an inside diameter substantially equal to the outside diameters of the neck 22 and adapter 24. The length of the spout is substantially equal to or somewhat less than the length of the insert 26. On its inner end, the spout 28 is provided with an out turned flange or saddle 36 which is shaped to conform with the curved shape of the outside surface of the main body 12.

The Tee fitting 10 is made by first gluing the insert 26 to the neck 22. The insert fits closely inside of neck 22 with the outside surface of the insert in contact with and glued to the inside surface of the neck 22. The spout 28 is also glued to the neck 22 and to the main body 12. The spout is closely sleeved around the neck 22 with the inside surface of the spout in contact with and glued to the neck 22 and with the inside surface of flange 36 in contact with and glued to the outside surface of the main body 12. The flange 36 completely surrounds opening 20 and neck 22.

The inner end portion of the adapter 24 is sandwiched between and glued to both the insert 26 and spout 28. The adapter is inserted between the insert and spout and is arranged generally end to end with the neck 22, as best shown in FIG. 3. The inside surface of the adapter is in contact with and glued to the outside surface of insert 26, while the outside surface of the adapter is in contact with and glued to the inside surface of the spout 28. Any suitable glue can be used to bond together the various parts of the fitting.

When constructed in this manner, the Tee fitting 10 has greater strength and ability to withstand side blows than the plastic Tee fittings that have heretofore been available. The adapter 24 forms an outward extension or continuation of neck 22, and the joint between the neck and adapter is strengthened and reinforced on both the inside and outside. On the inside, the insert 26 is glued both to the neck and to the adapter, while the spout 28 is glued to both the neck and adapter on the outside. Consequently, there is essentially a triple wall construction with the neck 22 and the aligned adapter 24 forming the center wall and glued to the insert on the inside and to the spout on the outside. The connection of the saddle shaped flange 36 to the main body 12 further strengthens the connection. The relatively large surface areas of the glue joints gives the stem portion of the Tee fitting 10 the ability to withstand relatively large side loads without failure. The insert 26 and spout 28 extend more than half the length of the adapter 24 and have their outer ends substantially even with one another.

The adapter 24 is aligned with neck 22 to provide a flow passage oriented perpendicular to the flow passage presented by the main body 12. In the assembled condition of the fitting, the inside diameter of the insert 26 is substantially equal to that of the rib 32 and an externally threaded plastic pipe (not shown) which is screwed into the female pipe threads 30. Consequently, there is little tendency for flow disruption to occur at the intersection between the branch line and the main flow line of the plastic pipe system.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A rigid plastic tee fitting comprising:
    a main conduit body having a generally cylindrical wall constructed of rigid plastic and defining a flow passage, said body having opposite ends and presenting a generally circular opening in said wall between said ends;
    a hollow adapter aligned with said opening and extending outwardly from said wall generally perpendicular to said main body, said adapter being constructed of rigid plastic and having an outer end arranged to connect with another conduit;
    a generally cylindrical insert received closely inside of said adapter against an inside surface thereof, said insert being constructed of rigid plastic and being bonded to said body and to the inside surface of said adapter; and
    a rigid plastic spout sleeved closely around said adapter against an outside surface thereof, said spout being bonded to said body and to the outside surface of said adapter to secure the adapter to the body in alignment with said opening.

2. The invention of claim 1, wherein:
    said body has a generally cylindrical hollow neck projecting outwardly from said wall and extending around said opening;
    said adapter and neck have substantially equal inside and outside diameters and are arranged generally end to end;
    said insert has an outside diameter substantially equal to the inside diameters of the adapter and neck; and
    said insert is fitted closely in said adapter and neck with the outside surface of the insert contacting and being bonded to the inside surfaces of the adapter and neck.

3. The invention of claim 2, wherein:
    said spout has an inside diameter substantially equal to the outside diameters of said adapter and neck; and
    said spout is sleeved closely around said adapter and neck with the inside surface of the spout contacting and being bonded to the outside surfaces of the adapter and neck.

4. The invention of claim 3, including a flange on said spout disposed in contact with and bonded to an outside surface of said body at a location to surround said opening.

5. A rigid plastic Tee fitting comprising:
    a main conduit body having opposite ends and a rigid plastic cylindrical wall defining a main flow passage extending between said ends, said wall presenting a circular opening therein at a location between said ends and having a rigid hollow neck projecting outwardly from said wall around said opening;
    a hollow adapter arranged generally end to end with said neck to provide an outward extension thereof forming a flow passage intersecting with and generally perpendicular to said main flow passage, said adapter being constructed of rigid plastic and having an outer end arranged to connect with a conduit;
    a generally cylindrical insert received closely inside of said neck and adapter in contact with inside surfaces thereof; said insert being constructed of rigid plastic; and a generally cylindrical rigid plastic spout sleeved closely around said neck and adapter in contact with outside surfaces thereof to sandwich the neck and adapter between the spout and insert, said spout and insert being bonded to the respective outside and inside surfaces of said neck and adapter to rigidly secure said adapter to the main conduit body.

6. The invention of claim 5, including a flange on said spout disposed in contact with and bonded to the outside surface of said main conduit body.

7. A rigid plastic Tee fitting comprising:
- a rigid plastic body having a generally cylindrical wall forming a flow passage, said body having opposite ends and presenting a generally circular opening through said wall at a location between said ends;
- a rigid plastic hollow neck integral with said wall and projecting outwardly therefrom, said neck extending around said opening;
- a hollow adapter arranged generally end to end with said neck to form a continuation thereof oriented substantially perpendicular to said body, said adapter being constructed of rigid plastic and having an inner end portion and a threaded outer end portion;
- a rigid plastic cylindrical insert fitted closely inside of neck and adapter and bonded to said neck and to the inner end portion of said adapter;
- a rigid plastic cylindrical spout sleeved closely around said neck and bonded to said neck and the inner end portion of said adapter, said spout having an inner end carrying a flange thereon which is bonded to the outside surface of said body.

8. The invention of claim 7, wherein said insert and spout have approximately the same length.

* * * * *